(12) United States Patent
Will et al.

(10) Patent No.: US 8,561,120 B2
(45) Date of Patent: Oct. 15, 2013

(54) CONTROL DEVICE, SMART CARD READING ACTIVATION DEVICE AND ASSOCIATED PRODUCTS

(75) Inventors: Patrick Will, Rennes (FR); Olivier Horr, Rennes (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 1472 days.

(21) Appl. No.: 10/926,613

(22) Filed: Aug. 26, 2004

(65) Prior Publication Data
US 2006/0059503 A1 Mar. 16, 2006

(30) Foreign Application Priority Data

Aug. 29, 2003 (EP) ..................................... 03292128

(51) Int. Cl.
*H04N 7/173* (2006.01)
(52) U.S. Cl.
USPC ...... 725/131; 725/2; 725/6; 725/25; 725/100; 725/132; 725/133; 725/134; 348/211.1; 348/211.2; 348/211.3; 348/211.4; 348/211.5; 710/24; 710/29; 710/301; 710/313; 713/172; 713/194; 713/300
(58) Field of Classification Search
USPC ........................................................ 713/172
See application file for complete search history.

(56) References Cited

U.S. PATENT DOCUMENTS

| | | | |
|---|---|---|---|
| 5,089,793 A | 2/1992 | Nagao | |
| 6,263,392 B1 | 7/2001 | McCauley | |
| 6,694,399 B1 * | 2/2004 | Leydier et al. | 710/301 |
| 6,978,335 B2 * | 12/2005 | Lee | 710/305 |
| 7,152,127 B1 * | 12/2006 | Brisebois et al. | 710/303 |
| 2002/0087968 A1 * | 7/2002 | Krishnan et al. | 725/6 |
| 2002/0124193 A1 * | 9/2002 | Colman | 713/300 |
| 2005/0125842 A1 * | 6/2005 | Calmels et al. | 725/132 |
| 2006/0027654 A1 * | 2/2006 | Chang et al. | 235/441 |

FOREIGN PATENT DOCUMENTS

| | | |
|---|---|---|
| DE | 101 27 124 A1 | 5/2001 |
| EP | 0 923 246 A2 | 6/1999 |
| EP | 0923246 | 5/2007 |
| JP | 61157127 | 7/1986 |
| JP | 62047764 | 3/1987 |
| JP | 62111145 | 5/1987 |

(Continued)

OTHER PUBLICATIONS

Okoth I., et al. DVB: Common Interface als the Ideal Interactive Multimedia Environment, Femseh-Und Kino-Technik, VDE VERLAG GNBH, Berlin, DE vol. 51, No. 12. 1997, pp. 854-856.

(Continued)

*Primary Examiner* — Nathan Flynn
*Assistant Examiner* — Bryan Wright
(74) *Attorney, Agent, or Firm* — Tutunjian & Bitetto, P.C.

(57) ABSTRACT

The present invention concerns a control device (1) provided for smart card readers (SCR), a smart card reading activation device (2) and associated products including a set-top box and a daisy chain.
The control device comprises means for communicating (11) with at least two smart card reading devices (SCR3, SCR4, SCR5), means for processing (12) information received from those reading devices and means for activating (13) at least one of those reading devices for a current communication. The activating means are intended to send selection data (SD) towards all those reading devices, those selection data enabling each of the reading devices to determine if it is selected or not for the current communication.

18 Claims, 8 Drawing Sheets

(56) References Cited

FOREIGN PATENT DOCUMENTS

| | | |
|---|---|---|
| JP | 03206510 | 9/1991 |
| JP | 05282067 | 10/1993 |
| JP | 11095994 | 4/1999 |
| JP | 2000036820 | 2/2000 |
| WO | WO 00/59210 | 10/2000 |

OTHER PUBLICATIONS

European Search Report dated Dec. 11, 2003.

* cited by examiner

CONTROL DEVICE, SMART CARD READING ACTIVATION DEVICE AND ASSOCIATED PRODUCTS

CROSS REFERENCE TO RELATED APPLICATION

This application claims priority to and all benefits accuring from Euriopean Application No. 03292128.0 filed on Aug. 29, 2003.

BACKGROUND OF THE INVENTION

1. Field of the invention

The present invention relates to a control device for smart card readers, a smart card reading activation device, and corresponding products.

2. Description of the Related Art

Set-top boxes (hereinafter noted "STBs") are designed for different kinds of TV program reception and decoding. TV reception may be only analog, only digital, or analog and digital. In case of analog reception, the TV programs are generally not encrypted. As a consequence, the user is able to view the programs without having to pay special fees. In this case, the STBs need not be equipped with smart card interfaces allowing the TV program de-encryption.

In case of digital reception, the TV programs may be broadcast without any encryption, being then "free to air" programs, or be encrypted. In the latter case, a smart card interface is needed.

Depending on the TV program broadcast, it may also be necessary to pay for the selected TV program before being able to de-encrypt it. In this scenario, not only a typical de-encryption smart card interface is necessary, but usually also a "banking" smart card interface. The difference between "de-encryption" and "banking" smart card interface relates to the standard it has to comply with, which may impact on hardware (however, if an STB is equipped with two smart card readers, most of the time, they are designed with exactly the same hardware).

Set-top boxes have usually one or two smart card readers, allowing implementations as described below:
- one de-encryption smart card reader,
- or two de-encryption smart card readers, each one processing a different de-encryption process, which may notably consist in different standards (standards may be slot affected or not),
- or one de-encryption smart card reader and one banking smart card reader.

Above possibilities allow to respond to most common configurations that can be found on the STB market. However, the following configurations may appear and are not taken into account:
- STB size is too small for a second smart card reader (it is the case for some new STB generations, which tend to decreasing sizes),
- STB user may wish to de-encrypt user friendly more than two different encryption standards; namely, it would be desirable to avoid user operation for insertion of the relevant smart cards when zapping from one program to another, the cards being ideally always inserted in the corresponding smart card readers.

A possible solution to solve those problems would consist in adding one or several external smart card readers, further to the STB including its own internal smart card readers. However, this would involve providing specific output connectors, one for each external smart card reader, and this would increase consequently the complexity of the control system, notably to activate and de-activate the relevant smart card readers for the current communications.

Document EP-0923246 concerns an interface for connecting one or more conditional access modules to a receiver. That interface includes interface sections, each for connection with a respective socket for receiving a conditional access module. Moreover, each interface section has input lines and output lines for connection to the corresponding socket. The interface sections are arranged in series, with the input lines of one interface section being connected to the output lines of the next interface section. Further, each interface section includes an electronically controllable switch connecting the output lines of that interface section to the input lines of the same interface section, such that each socket may be selectively bypassed when the associated conditional access module has not been connected.

Though that technique appears flexible in use, it requires some specific components, like tri-state buffers or special electronically controllable switches. Moreover, it is necessary to check systematically for each interface section if a conditional access module is present or not, which is processing consuming.

Document WO-00/59210 describes a system for interfacing multiple conditional access card modules. Several interface circuits of a conditional access unit provide access to respective cards. A central processor of that unit is coupled to the interface circuits to communicate with the card modules. The central processor determines which cards to address by extracting a code from service information in a received stream. Then, either it contacts selectively the targeted card module (in a non-specified way) or, when the card modules are connected in a daisy chain, it sends a same transport stream to all the series card modules (no selection is then done).

Thus, that prior art either does not provide selection of the card modules, or relies on multiple interfaces, one for each selectable card module.

SUMMARY OF THE INVENTION

The present invention concerns a control device, making it possible to offer two or more smart card reading units, while enabling small STB dimensions and/or reading potentialities suitable for three kinds of exploitation or more (banking, various de-encryption methods). The control device of the invention may have those advantages while remaining user friendly, limiting the number of required connectors and having a relatively restricted complexity.

The invention concerns also a set-top box comprising such a control device, as well as corresponding smart card reading activation device, daisy chain and computer program.

It applies notably to the field of Pay-Per-View television.

To this end, the invention relates to a control device comprising:
- means for communicating with at least two smart card reading devices,
- means for processing information received from the smart card reading devices,
- and means for activating at least one of those reading devices for a current communication.

According to the invention, the activating means are intended to send selection data towards all those reading devices, those selection data enabling each of the reading devices to determine if that reading device is selected or not for the current communication.

The activating means are "intended" to send the selection data in that they comprise all required functionalities for obtaining or generating those appropriate selection data and for ordering the communicating means to address all the reading devices with those selection data.

Thus, contrary to what is usually done, the activation is decided at the level of the receiving smart card reading devices, the same signals being able to be sent to all those reading devices. This technical feature may be relatively easy to implement. Further, it makes it notably possible to use smart card readers external to an STB in a user friendly way, while possibly using a very reduced number of connection points between the STB and the smart card readers.

Namely, relevant signals bearing the selection data may be transmitted in a simple way to all the concerned smart card readers. Such a transmission may in particular be obtained by series transmission of those signals between the smart card readers. It can also be obtained by broadcast transmission, notably via wireless communication.

As an illustration, the control device of the invention may allow an STB to address up to four external smart card readers by simply adding them as accessories. In appropriate embodiments, several different encryption smart cards can then be used, without having to exchange them in a unique reader when zapping from a program to another. The external readers may further still comply with the smart card reader standards, since the interface between the smart cards and the external readers may be kept classical.

It should be noted that the targeted smart card reading devices are preferably external to the apparatus containing the control device (typically, the STB), but that at least some of them can also be internal thereto.

Also, further to the targeted reading devices, namely those which are intended to receive the selection data and to decide self-activation or not, the control device may also control other smart card readers. Another mechanism is then used for the latter, such as those already widespread. Thus, in a preferred embodiment, an STB is intended to address one or two internal reading devices in a classical way, and to control external readers as defined for the control device of the invention.

It is interesting that only one reading device is active at the same time, which avoids excessive power supply current consumption.

In a preferred implementation, the reading devices to be activated are chosen automatically by the control device, without any user intervention. This is advantageously done by associating during prior configuration of the control device, each reading device to a given type of received signals (banking, encryption according to given standards . . . ) and to given values of the selection data. That prior configuration may be implemented simply with software.

In a variant embodiment, the control device makes possible for the user to activate especially any of the reading devices, for example by entering a given designation number or by pressing a given button among several available ones. Preferably, the control device enables the user to associate the reading devices to respective functionalities (banking, decrypting according to given standards . . . ), and is intended to register the user choices for later receptions. That embodiment is preferably combined with the previous achievement, a base configuration being provided by default, and the user having the possibility to modify it manually.

Other parameters may also be exploited for selecting the appropriate reading devices for given received signals. Notably, in an improved embodiment, the control device is able to check if a targeted reading device is operable (namely is operational, is supplied with an appropriate card and/or is not already busy) and if not, is intended to choose another reading device as the targeted one. This may be repeated for several successively non-operable reading devices, in a given predetermined priority order based on a sorted preference list (for example pre-configured during installation).

Preferably, the activating means are intended to use at least one control voltage available to the reading devices for the selection data, each of those reading devices being associated with a given range of the control voltage. Such use of a voltage with its amplitude shared in several parts proves very practical and efficient.

More specifically, according to a preferred embodiment, the control device is intended to provide power supply to the reading devices and that power supply is bearing the control voltage. Thus, the power supply achieves two functions at the same time: bringing power to the reading devices and controlling their respective activations.

Also, the control device comprises advantageously means for controlling reset in the reading devices by sending reset signals towards those reading devices. Those reset means are intended to use the control voltage for reset controlling, by causing given voltage changes within the voltage ranges to specify a change of reset state in the reading devices respectively associated to those voltage ranges.

Thus, the control voltage enables not only to select the currently activated reading devices, but also to change its reset state if desired. In the case the power supply is exploited, a third function of the latter is then added to the preceding ones.

Preferably, the activating means are intended to send the selection data on a number of selection communication paths which is inferior to the number of the reading devices, so that at least one of the reading devices receiving the selection data via respectively at least one of the selection communication paths, is intended to transmit those received selection data to at least another of those reading devices.

Namely, series implementation and behaviour are allowed. Thus, notably, an STB and appended readers may form a daisy chain, enabling any desired number of smart card types.

Advantageously, the control device comprises means for associating the reading devices with respectively given functionalities, such as notably specific de-encrypting methods and banking. Those means may be implemented as software, providing preferably an installation software menu that allows defining notably the number of external additional smart cart readers and their respective functions.

The de-encrypting methods may rely on current algorithms (standards) such as for example those commercially exploited under the names Viaccess, Mediaguard, Conax or Betacrypt.

Advantageously, the control device comprises means for providing differential transmission clock signals towards the reading devices.

Also, the control device being intended to provide clock signals having at least one amplitude towards the reading devices via at least one clock path, it is advantageous that the control device comprises means for transmitting data towards those reading devices via at least one of those clock paths. The data transmission means are then intended to specify data transmission towards the reading devices on that clock path by using data signals having an amplitude inferior to a data transmission threshold lower than the clock amplitude on that clock path. Thereby, the number of transmission paths may be reduced, without prejudicing the clear identification of the data transmission with respect to the clock signals.

Also advantageously, the control device being intended to send clock signals having at least one amplitude towards the reading devices via at least one clock path, the control device comprises means for detecting the presence of smart cards associated to the smart card reading devices, by receiving detection signals from the reading devices via that clock path. Then, the number of communication paths may be reduced, the same path being able to be used both in the direction from the control device to the reading devices, and in the reverse direction.

Preferably in that case, the control device also comprises means for receiving data from the reading devices via the clock path used for receiving the detection signals. The detection and data reception means are able to recognize respectively the received detection and data signals on the clock path by comparing the amplitudes of the signals received via that clock path to respectively a card detection threshold and a data reception threshold.

This improvement may still decrease the required number of communication paths, while enabling reliable distinctions between the various kinds of transmission.

The invention also relates to a set-top box, characterized in that it comprises a control device compliant with any embodiment of the invention.

Such a "master" STB may have a reduced size while allowing any desired number of smart card types, thanks to communication with external smart card reading devices.

In a preferred embodiment, that set-top box comprises at least one output connection element being provided with four communication points respectively intended for:
- output ground signals;
- output positive clock signals;
- output negative clock signals;
- and output power supply, reading devices activation and reset signals.

More specifically, the connection element is preferably such that:
- the communication point for output negative clock signals is also provided for input detection signals related to the presence of smart cards associated to the reading devices, and for input data reception signals;
- and the communication point for output positive clock signals is also provided for output data transmission signals.

Thus, the number of required communication paths may be considerably reduced, and in practice limited to four for each connection element. This enables the use of small connectors, such as a four wires basic jack connector, which is preferable for low cost STB and reduces the place necessary at the STB rear panel. On the other hand, a unique connection element may be necessary for the STB, insofar as a series arrangement is adopted for the external readers.

The invention also relates to a smart card reading activation device associated with a smart card reading device, said activation device comprising means for communicating with a control device. According to the invention, that activation device comprises:
- means for analysing selection data received from the control device,
- means for accessing a database containing predetermined activation criteria associated with the selection data,
- and means for activating the smart card reading device only when the selection data are compliant with those predetermined criteria.

The activation device is preferably intended to cooperate with a control device compliant with any embodiment of the invention.

Another object of the invention is a smart card reading device comprising a smart card reading activation device according to the invention, that reading device being preferably intended to cooperate with a set-top box compliant with any embodiment of the invention.

According to a preferred embodiment, the smart card reading device comprises at least one input connection element and at least one output connection element, each of those input and output elements being provided with four communication points respectively intended for:
- ground signals,
- positive clock signals;
- negative clock signals;
- and power supply, reading devices activation and reset signals.

That activation device is preferably intended to cooperate with a set-top box compliant with the embodiments of the invention, including the output connection element.

Thus notably, like for the STB, each extension smart card reader may be provided with a very limited number of communication points for each connector, four being enough in preferred embodiments. Moreover, only two connectors (respectively for input and output) may be required for each external smart card reader.

The invention also relates to a daisy chain comprising at least one set-top box and at least two smart card reading devices compliant with the embodiments of the invention. This corresponds to the series configuration mentioned above, with possibly cascading smart card readers.

An additional aspect of the invention is a computer program product comprising program code instructions for executing the means of the control device or of the smart card reading activation device of the invention, when that program is executed on a computer. By "computer program product", it is meant a support for computer program, which can consist not only in a storing space containing that program, such as a diskette or a cassette, but also in a signal, such as an electrical or optical signal.

Also, the program code instructions are said intended "for executing the means", in that they provide all software functionalities necessary for implementing those means—even if some complementary non-software elements may be required.

BRIEF DESCRIPTION OF THE DRAWINGS

The invention will be better understood and illustrated by means of the following embodiment and execution examples, in no way limitative, with reference to the appended figures on which:

FIG. 9A shows the signals transmitted back on a negative clock path and FIG. 9B shows an interpretation of that signal at the STB;

FIG. 10A shows the signals transmitted on a positive clock path and FIG. 10B shows an interpretation of that signal at the external smart card readers;

In FIGS. 1 to 3, the represented blocks are purely functional entities, which do not necessarily correspond to physical separated entities. Namely, they could be developed in the form of software, or be implemented in one or several integrated circuits.

Moreover, a generic notation liable to be completed by indexes, like for example "SCR" (for "smart card reader"), refers to a given model object (e.g. a smart card reader of a determined type), which may be specified into specific items (e.g. the considered smart card reader).

DETAILED DESCRIPTION OF THE INVENTION

Figure 1:
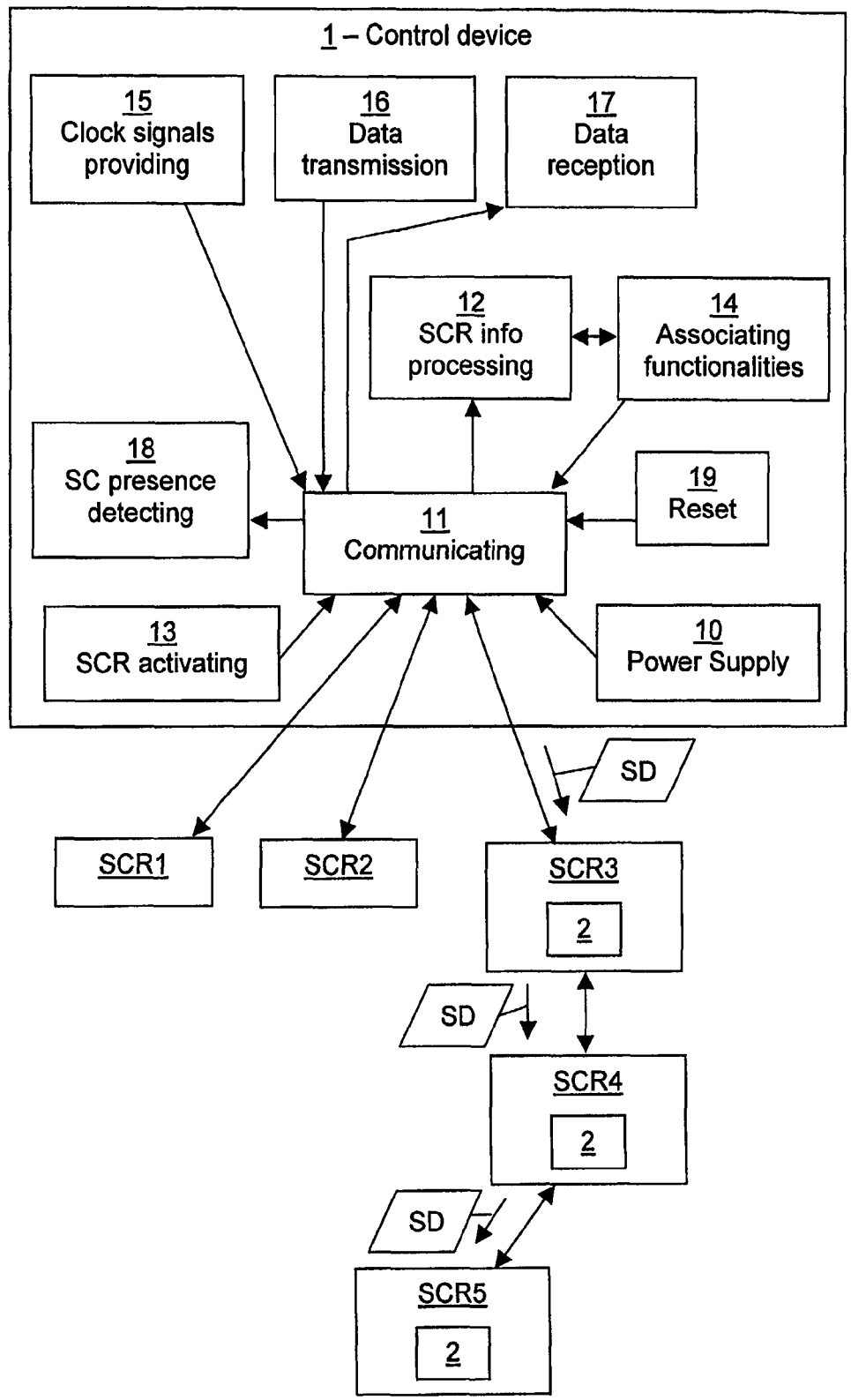
FIG. 1 is a block diagram of a control device compliant with the invention for smart card readers.

A control device 1 (FIG. 1) comprises a unit 11 for communicating with several internal and external smart card readers SCR. In the illustrated example, the control device 1 is connected directly with three smart card readers SCR1, SCR2 and SCR3, and indirectly with two further smart card readers SCR4 and SCR5, which are in series with SCR3. The control device 1 enables other configurations, so that the illustrated one is only a typical case.

The control device 1 also comprises a unit 12 for processing information received from the smart card readers SCR and a unit 13 for activating at least one of those readers SCR for a current communication. In the example detailed below, only one reader SCR is activated at a given time.

The control device 1 is intended to activate some of the readers SCR, here SCR1 and SCR2, in a classical way, namely by sending special instructions towards those readers SCR at appropriate moments. However, the other readers SCR, here SCR3, SCR4 and SCR5, are intended to be activated in a special way: when the control device 1 is to activate one of them, the activating means 13 send same selection data SD towards all of them (SCR3, SCR4 and SCR5). Those data SD enable each of those readers SCR to determine itself if it is selected or not for the current communication. In practice, all the potentially targeted smart card readers SCR are provided with a smart card reading activation device 2, which is able to trigger such activation.

In the special series configuration illustrated here, the control device 1 has only to send the data SD to the reader SCR3, which is intended to transmit them to the reader SCR4, and itself to the reader SCR5. As only one SCR is selected at one time, the SD data give the identity of the selected reader SCR, among SCR3, SCR4 and SCR5.

The control device 1 also comprises a power supply unit 10, which is intended to provide power supply to some of the readers SCR, which are external to the apparatus comprising the control device 1. In the present example, this power supply bears a control voltage CV, which is used for the selection data SD. An especially interesting embodiment thereof will be detailed below.

The control device 1 comprises also:
a unit 14 for associating the readers SCR with given functionalities, respectively; these functions may consist in banking and de-encryption standards; the association is preferably done through an installation software menu;
a unit 15 for providing clock signals intended for the readers SCR; in the illustrated example, they consist in differential transmission clock signals comprising a positive clock signal CLK+ and a negative clock signal CLK−;
a unit 16 for transmitting data towards the readers SCR;
a unit 17 for receiving data from the readers SCR;
a unit 18 for detecting the presence of a smart card in any of the readers SCR, by receiving and analysing detection signals from the readers SCR;
and a unit 19 for controlling reset in any of the readers SCR, by sending reset signals towards the readers SCR.

Figure 2:
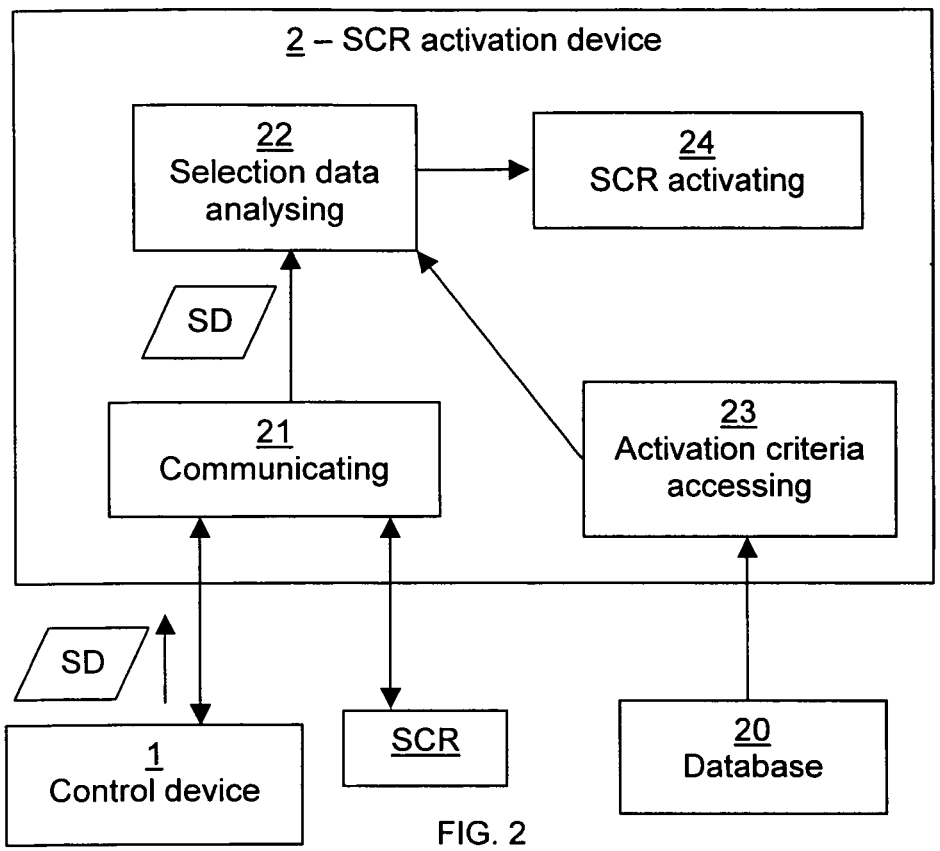
FIG. 2 is a block diagram of a smart card reading activation device compliant with the invention, intended to cooperate with the control device of FIG. 1.

The smart card reading activation device 2 (FIG. 2) implemented in the readers SCR able to use the selection data SD for self-activation (namely, SCR3, SCR4 and SCR5) comprises a unit 21 for communicating with the control device 1 and also with possibly other readers SCR.

It also includes:
a unit 22 for analysing the selection data SD received from the control device 1, possibly via one or several of the readers SCR;
a unit 23 for accessing a database 20 containing predetermined activation criteria associated with the selection data SD;
and a unit 24 for activating the smart card reader SCR including the activation device 2 when, and only when, those selection data SD are compliant with those predetermined criteria.

Figure 3:
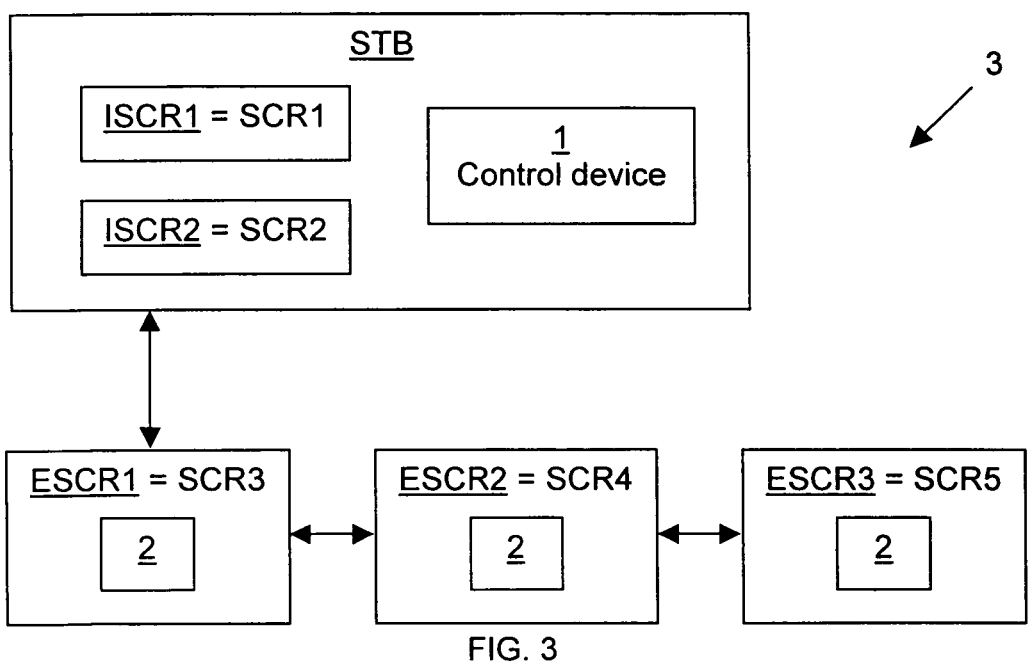
FIG. 3 shows schematically an STB comprising the control device of FIG. 1, two internal smart cart readers, and three external smart cart readers comprising the activation device of FIG. 2.
Figure 4:
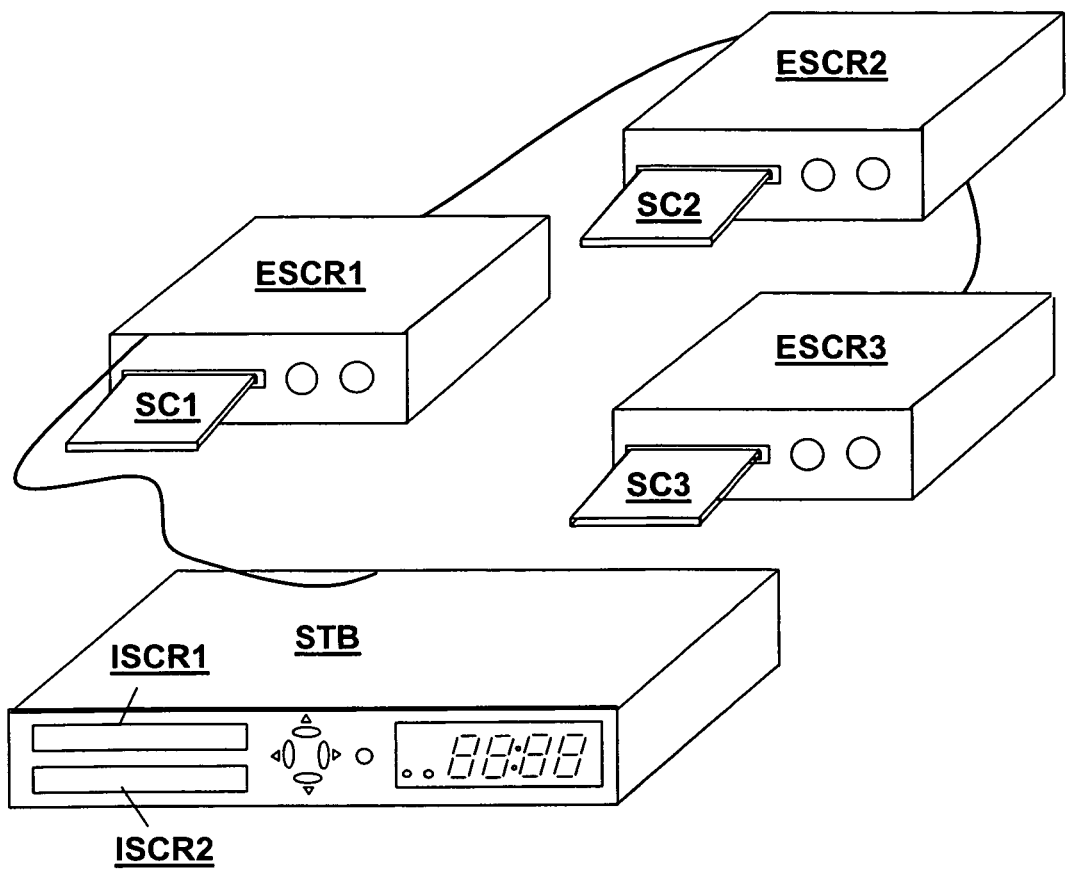
FIG. 4 illustrates the configuration of FIG. 3 with the inserted smart cards.

A special illustrative configuration involving the control device 1 and activation device 2 above will now be described (FIGS. 3 and 4). The control device 1 is incorporated in an STB (which constitutes a master set-top box), together with the smart card readers SCR1 and SCR2—"internal" smart card readers. Also, the series smart card readers SCR3, SCR4 and SCR5 comprising each the activation device 2 are external to that STB, the first reader SCR3 being connected to the STB. They constitute special accessories.

For clarity with respect to the used indexes, the readers SCR1 and SCR2 are respectively noted herein below ISCR1 and ISCR2 (for "Internal Smart Card Readers", generic notation: ISCR), and SCR3, SCR4 and SCR5 are respectively noted ESCR1, ESCR2 and ESCR3 (for "External Smart Card Readers", generic notation: ESCR).

Figure 5:
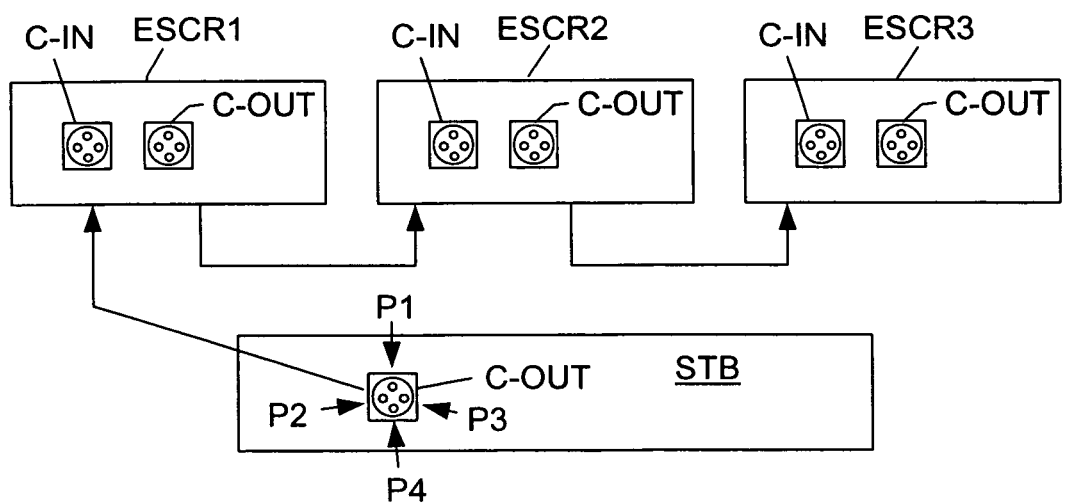
FIG. 5 shows the input and output connectors of the STB and external smart cart readers of FIGS. 3 and 4.

The readers ESCR1, ESCR2 and ESCR3 are respectively able to read smart cards SC1, SC2 and SC3 (generic notation: SC, which applies also to smart cards inserted in the internal readers ISCR), typically for de-encryption. They are daisy chained with the STB (FIG. 5) by means of basic jack connectors C-OUT and C-IN, each being provided with four communication points P1, P2, P3 and P4 respectively intended for four wires. The connectors C-OUT and C-IN, hereinafter called "output" and "input" connectors", respectively, are essentially intended for output and input signals, respectively. Thus, the STB comprises only one such output connector C-OUT, while each of the external readers ESCR comprises both such input and output connectors C-IN and C-OUT.

Even the last external reader of the chain, ESCR3, also comprises the output connector C-OUT, since the external readers ESCR are identical, for standardization reasons. This provides a complete modularity of the external readers ESCR. Also, the chain may be further extended beyond the third reader ESCR3, insofar as the control device 1 enables the control of more than three external readers ESCR. An STB installation software menu allows defining the number of additional smart card readers ESCR and their functions (banking or de-encryption, and for which standards).

In practice, the system of the present example is limited to four potentially cascaded external readers ESCR, due to the type of selection data SD (detailed below). However, the number of potentially connectable accessory readers can be made higher without difficulty.

The internal and external readers ISCR and ESCR comprise standard interfaces that provide the following signals to the associated smart cards SC:
power supply (called SCxVCC-CMD, provided by the STB to the smart cards SC);
reset (called SCx-RST, from the STB to the smart cards SC);
clock (called SCx-CLK, from the STB to the smart cards SC);
data (called SCx-DATA, bi-directional: STB to smart cards SC and smart cards SC to STB, via half duplex communication); and
detect (called SCx-DETECT, from smart cards SC to STB).

The following standard smart card reader applications are adopted here:
the power supply is either +5V (the most common, for class A smart cards) or +3.3V (for class B smart cards); only class A smart card readers are addressed in the presently developed example, but this can be extended in order to manage class A and class B readers;
clock signal is fast running (between 1 and 5 MHz); this clock signal is provided towards all smart cards SC without corruption, preventing any failure in the system; a differential transmission is chosen: it allows to reduce interferences, noise, cross-talk and problems due to cable length;
data signals are bi-directional; sometimes, it is the STB that "talks", and sometimes it is the smart card SC that "talks"; data speed is slow compared to the clock: namely, the data elementary bit period (one ETU=Elementary Time Unit) is equal to 372 clock periods;
reset signal is generated by the STB and is released when the power supply and clock are well established.

All electrical signals provided to the smart cards SC comply with the ISO7816 standard and as a consequence cope with well-defined timings.

The accessories (external readers ESCR) may then be compliant with all relevant smart card standards.

The described architecture is well suited to manage the signals defined above, to provide them to the external smart cards SC and to enable/disable any of the external smart cards SC. Further, the hardware timing related to the extension readers ESCR may not be slowed down.

To achieve those features, notably, the STB and extension readers ESCR connectors C-IN and C-OUT are fitted with the four following contacts constituting the communication points P1 to P4:
GND: ground providing a common reference between the STB and the additional accessories consisting in the readers ESCR;
CLK+: positive clock, at low level when the clock is not active;
CLK−: negative clock, high when the clock is not active;
VCC: provides extension smart card readers ESCR with the necessary power supply, reset signals, and card reader activation command (only one reader SCR being active at a given time), as detailed below.

Those four wires (including the ground signal GND) are enough for the interconnection between the STB and the external smart card readers ESCR.

Figure 6:
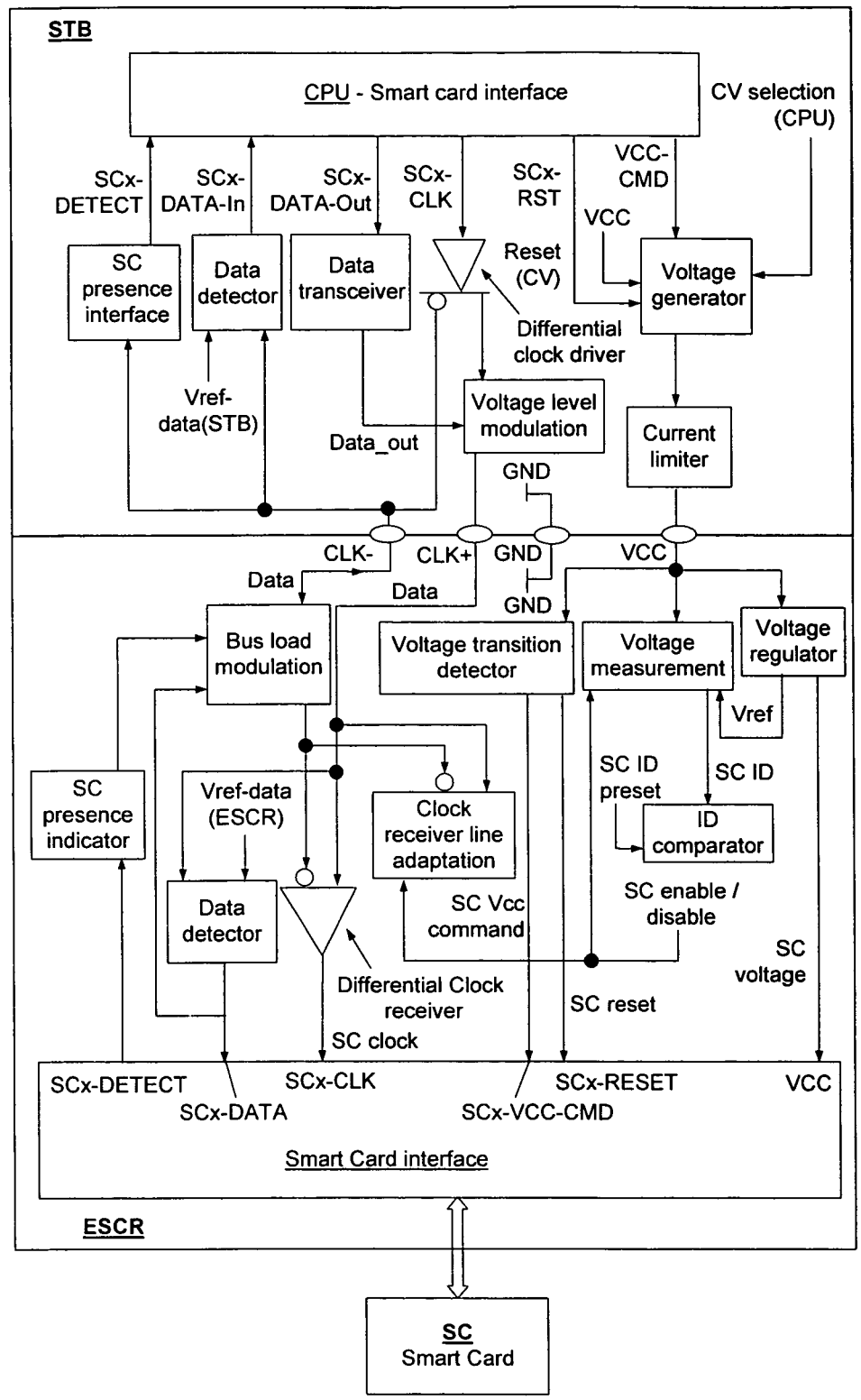
FIG. 6 gives a synoptic overview of the STB and of one of the external smart card readers of FIGS. 3 to 5.

A detailed architecture for the STB and external readers ESCR is detailed hereinafter (FIG. 6).

At the STB, a voltage generator delivers an appropriate power supply (VCC signal) for the external readers ESCR. That power supply bears a control voltage CV, which gives the selection data SD in function of its level. Thus, the power supply enables to select the external reader ESCR to be activated.

If no external smart card reader ESCR should be active, the voltage generator produces a standby voltage V0 of +5V. A current limiter is limiting the voltage generator output current, in order to prevent potential short circuits at the smart card extension bus or at the smart card connector itself. Current limitation is around 80 mA (according to ISO7816 standard, a maximum of 60 mA may be used by a smart card).

Figure 7:
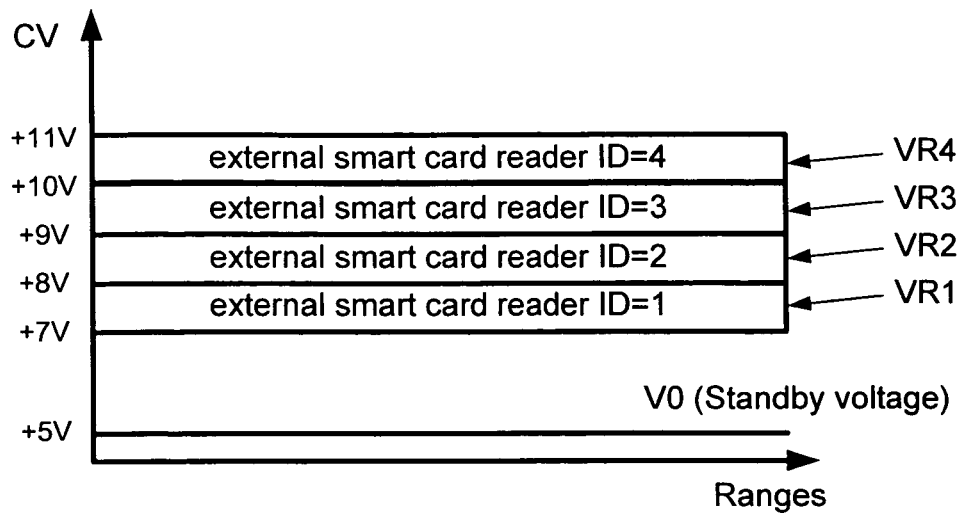
FIG. 7 shows voltage ranges defined for a power supply produced by the STB voltage generator, those ranges corresponding respectively to smart card readers connectable to the STB of FIGS. 3 to 6.

The voltage generator changes its output voltage if a specific one of the external readers ESCR should be activated, which is done through the power supply control signal VCC-CMD. The STB CPU (for "Central Processing Unit") provides an identifier ID of the targeted external reader ESCR, and this identifier is converted into a specific voltage level of the power supply (selection data SD), according to predetermined ranges (FIG. 7):
no activation of any external reader ESCR corresponds to standby voltage V0 of +5V;
external reader ESCR with ID=1 is associated with the voltage range VR1 between +7V and +8V;
external reader ESCR with ID=2 is associated with the voltage range VR2 between +8V and +9V;
external reader ESCR with ID=3 is associated with the voltage range VR3 between +9V and +10V;
and external reader ESCR with ID=4 is associated with the voltage VR4 range between +10V and +11V.

For instance, if the external reader corresponding to ID=3 (which could be ESCR3 in the present configuration) is to be activated, the control voltage CV changes from +5V to +9.2V (lower value+margin of 0.2V). If the external reader corresponding to ID=1 (which could be ESCR1) is to be activated, the control voltage CV changes from +5V to +7.2V (lower value+margin of 0.2V). If the selected external reader is to be disabled, the control voltage CV changes from the actual value towards +5V. Prior to voltage change, the reset and clock signals follow the standard timing.

Resulting from the number of voltage ranges of the control voltage CV borne by the power supply, up to four smart card readers ESCR can be connected on the extension bus. As set-top boxes have usually a +12V voltage, it is easy to provide to the external readers ESCR a voltage between +5V to +11V.

At the smart card extension (external reader ESCR, FIG. 6), the voltage received from the STB (power supply) is first regulated (voltage regulator), in order to provide a stable voltage towards the control electronics of the smart card interface, in the reader ESCR.

Each extension reader ESCR has been previously configured during its installation, by setting an internal ID associated with that reader ESCR to a unique value on the bus. It can be done for instance by using basic jumpers. The input control voltage CV is measured (voltage measurement) and compared to a reference in order to decide if the smart card reader ESCR should be activated or not (ID comparator).

If the reader ESCR must be activated, an enable signal is provided to a voltage transition detector, otherwise the signal indicates a disable state. The same enable/disable signal is also provided towards the smart card standard interface, in order to prepare it for the clock and reset signal to get active. Enable/disable signal also controls a clock adaptation function (clock receiver line adaptation) which adapts the clock bus by adding a resistor between CLK+ and CLK−.

After the voltage transition at the STB voltage generator, the clock is provided in a differential format (differential clock driver). The differential format proves very useful to reduce interferences with other signals and problems due to the cable, and speeds up to 10 MHz can be provided using twisted cable. The differential transmitter input signal being noted CLK, the differential clock driver produces a positive clock signal CLK+ and a negative clock signal CLK−:

CLK+ voltage at the transmitter output is 1V when CLK is low and 5V when CLK is high;
CLK− voltage at the transmitter output is 1V when CLK is high and 5V when CLK is low.

At the smart card extension reader ESCR, a differential clock receiver then provides a clean clock. It is able to provide:

a high level when typically CLK+>[CLK−+200 mV],
and a low level when CLK+<[CLK−−200 mV].

The signals CLK+ and CLK− are always positive voltages (referenced to the ground) and may have different absolute maximum values without disturbing the receiver.

Figure 8:
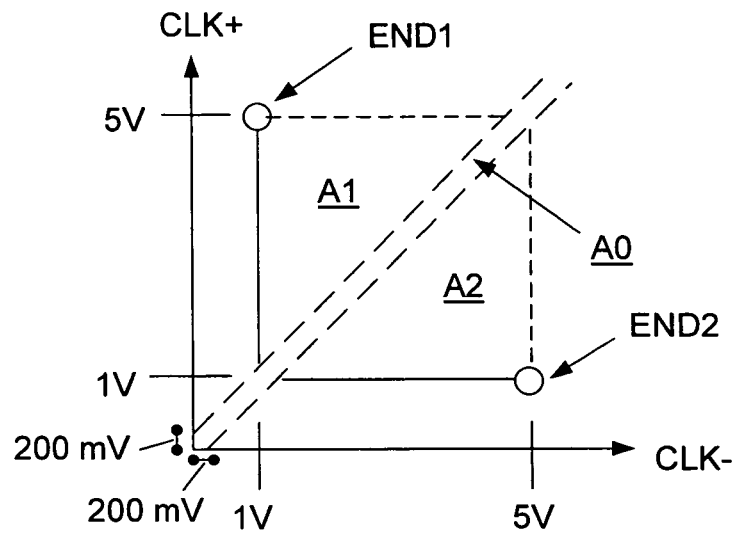
FIG. 8 shows voltage decision areas for differential transmission clock signals sent by the STB and received by differential clock receivers in the external smart card readers of FIGS. 3 to 6.

The differential receiver output voltage decision versus input voltage (FIG. 8) is thus given by the comparison between the signals CLK+ and CLK−:

in the small area END1 around CLK+=5V and CLK−=1V, clock is high;
in the small area END2 around CLK+=1V and CLK−=5V, clock is low;
in the diagonal area A0 corresponding to:
−200 mV<[CLK+-CLK−]<+200 mV, no correct clock reception is considered possible;
and in the upper area A1 and lower area A2 respectively upon and below the diagonal area A0, correct clock reception is possible (A1 area: high level, A2 area: low level).

Based on the receiver voltage decision areas, the differential clock bus is used to:
provide smart card presence information from the extension smart card reader ESCR towards the STB,
provide bi-directional data between the extension smart card reader ESCR and the STB.

STB clock transmitter output impedance on CLK+ and CLK− is voluntarily increased to around 100 Ω. Also, the clock CLK+/− voltage levels can be changed easily by just loading the signals with a basic resistor.

1/Detection of Smart Card Insertion

When the smart card SC is physically present in the extension reader ESCR (smart card presence indicator) and if the extension reader ESCR is active, the clock bus is loaded by a predefined resistor (located on CLK−, bus load modulation, CLK− being maximum when clock is not yet activated).

On the STB side, a voltage comparator followed by an integrator (smart card presence interface) checks if the CLK− voltage amplitude is below a defined threshold TH1. If this is the case, the smart card SC is recognized as physically present at the extension reader ESCR.

Figure 9A:
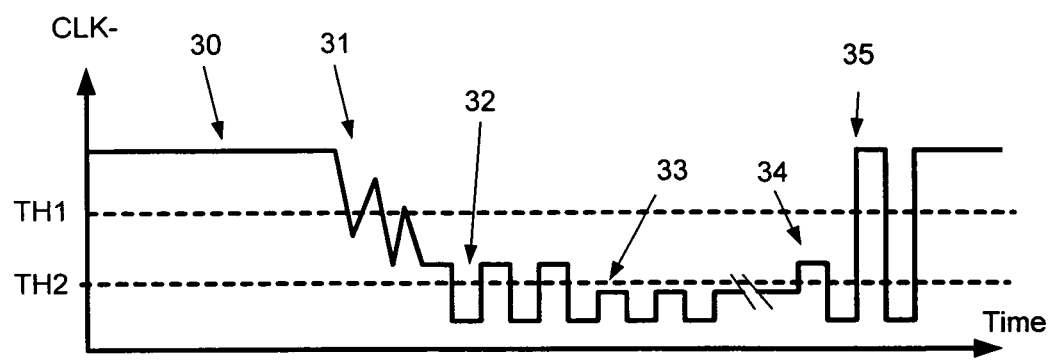
FIGS. 9A and 9B illustrate a smart card insertion detection process and a backwards data level detection process executed by means of signals transmitted back from the external smart card readers to the STB of FIGS. 3 to 6.
Figure 9B:
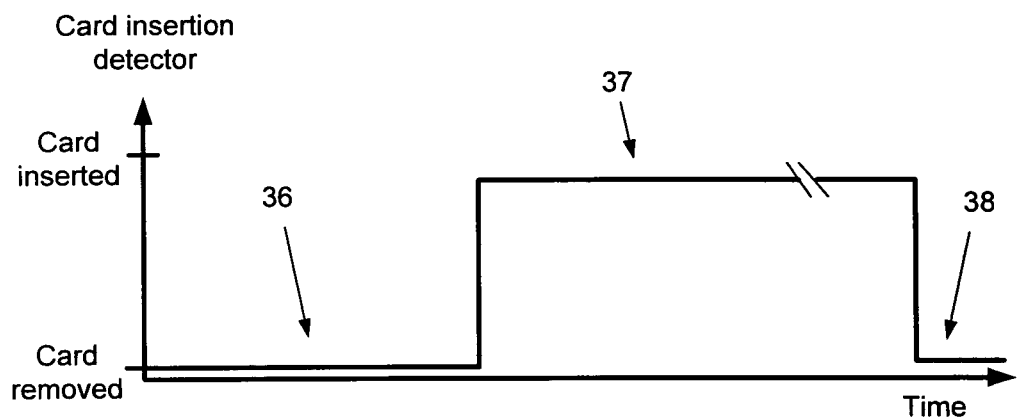

For example (FIG. 9A), the signal CLK− amplitude being above the insertion detection threshold TH1 (part 30) decreases with time (part 31) when a smart card SC is inserted in the remote reader ESCR, down to below that threshold TH1 (parts 32 to 34). So (FIG. 9B), the card insertion detector passes from the "card removed" state (part 36) to the "card inserted" state (part 37). When the signal CLK− amplitude increases again above the threshold TH1 (part 35), the card insertion detector comes back to the "card removed" state (part 38).

2/Data Exchanges Between the STB and the Reader ESCR

Data exchanges between the STB and the extension reader ESCR is based on CLK+ and CLK− voltage amplitude modulation. Namely, the data having a low state and a high state, clock voltage comparison to a threshold and integration allows to detect the data state—the bit duration is 372 times larger than the clock period.

This is used in both directions (from the STB to the reader ESCR and conversely):

data transmission from STB to extension smart. card reader ESCR is done using CLK+ signal: a data transceiver in the STB produces Data_out signals from the data output by the STB CPU (SCx-DATA-Out), and those signals are used by a voltage level modulation unit to change the amplitude of the CLK+ signal; at the extension reader ESCR side, a data detector analyses the received CLK+ signal compared with reference voltage data Vref_data [ESCR], and transmits the obtained data state information to the smart card interface;

data transmission from the extension smart card reader ESCR to the STB is done using CLK− signal: the bus load modulation unit receives data from the smart card interface (SCx-DATA) and uses them to change the amplitude of the CLK− signal; at the STB side, the CLK— signal is received by a data detector, that analyses that CLK− signal compared with reference voltage data Vref_data[STB], and transmits the obtained data state information (SCx-DATA-In) to the CPU.

The CLK− and CLK+ voltage levels are compared respectively to thresholds TH2 and TH3 (similarly to what is done for the smart card insertion detection), in order to decide if the data are low or high:

if the CLK+/− amplitude is not changed, data is high;
and if the CLK+/− amplitude is reduced, data is low.

Moreover, data exchanges are only possible if a card is inserted into the remote reader ESCR. In practice (FIG. 9A), the TH2 threshold is lower than the TH1 threshold. Thus, the CLK− signal shows data exchanges (amplitude lower than TH2) only insofar as it points out smart card insertion (amplitude lower than TH1).

In the illustrated example, the data exchanges are possible in parts 32 to 34 of the CLK− signal, since then, the card insertion detector is in the "card inserted" state (part 37). It then appears that data are received by the STB in part 33 only, for which the CLK+amplitude is below the TH2 threshold.

Figure 10A:
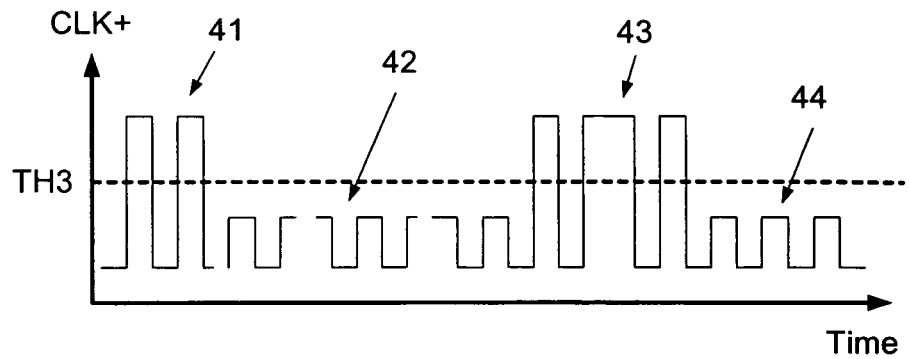
FIGS. 10A and 10B illustrate a forwards data level detection process executed by means of signals transmitted from the STB to the external smart card readers of FIGS. 3 to 6.
Figure 10B:
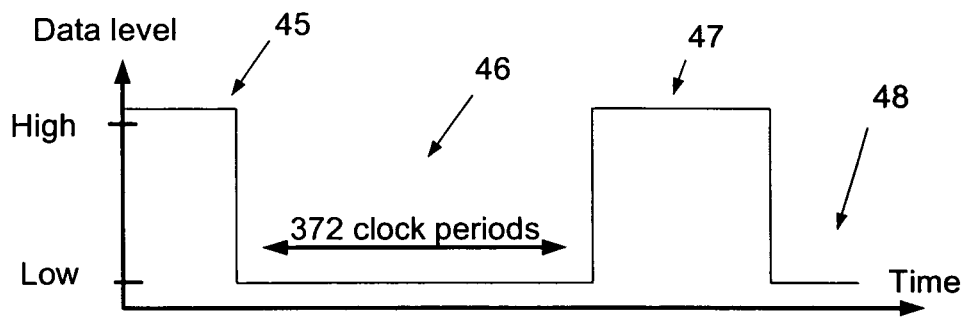

Illustrating correspondingly the data sending from the STB to the external reader ESCR (FIGS. 10A and 10B), the CLK+ amplitude being above the TH3 threshold (part 41) decreases with time to values below that threshold (part 42), so that the data detector of the external reader ESCR passes from a high level data state (part 45) to a low level state (part 46). Then, the CLK+ amplitude. successively increases above (part 43), and decreases below (part 44) the TH3 threshold, thereby inducing respectively a high data state (part 47) and a low data state (part 48) of the data detector.

Figure 11:
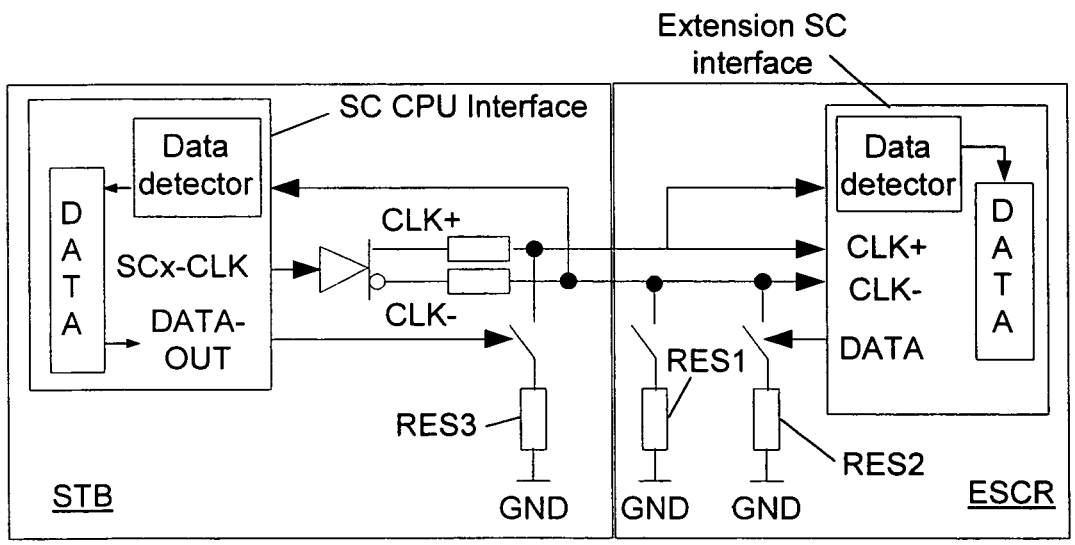
FIG. 11 shows schematically an implementation of the smart card insertion and data level detection processes of FIGS. 9 and 10 in the STB and one of the external smart card readers of FIGS. 3 to 6.

More specifically centering the presentation of the implementation mechanisms on the data exchanges (FIG. 11), the amplitude modulation of the CLK+ and CLK− signals is obtained by three switching systems forming dividing bridges. Those switching systems have respectively the following features:

- included in the external reader ESCR and able to connect the CLK− line to the ground GND via a resistor RES1 (corresponding to the threshold TH1, smart card detection);
- included in the external reader ESCR and able to connect the CLK− line to the ground GND via a resistor RES2 (corresponding to the threshold TH2, data transfer to the STB);
- and included in the STB and able to connect the CLK+ line to the ground GND via a resistor RES3 (corresponding to the threshold TH3, data transfer to the external reader ESCR).

3/Smart Card Reader ESCR Reset

Reset signal towards the smart card SC is generated using a voltage change of the power supply VCC (and thus of the control voltage CV), controlled by the STB. If the DC voltage changes by more than 0.3V and less than 0.6V, a change of the reset signal state is produced: if that voltage change is an increasing, reset is disabled, whereas if the voltage change is a decreasing, reset is activated. Further, a voltage change larger than 0.6V (which is the case during ESCR ID selection) causes no change in the reset state.

Figure 12:
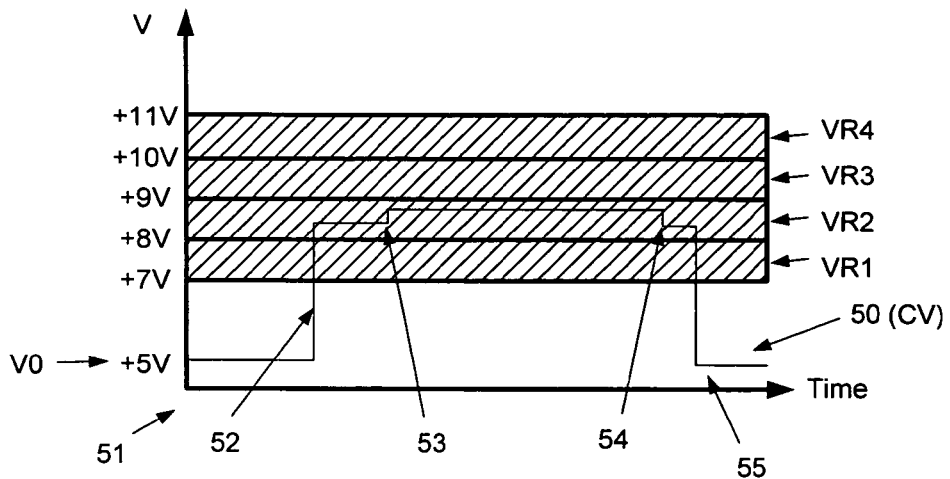
FIG. 12 illustrates a reset status control process of the external smart card readers of FIGS. 3 to 6 by means of the power supply including the voltage ranges of FIG. 7 (Voltage in function of time)

As an example (FIG. 12), the control voltage CV is controlled in time according to variations 50. That voltage CV is first at the standby voltage level 5V (part 51), and then increases up to a voltage between 8V and 9V and close to 8V (increasing step 52), which corresponds to the external reader ESCR with ID=2 (ESCR2). The latter is thus activated and reset is active. Later (increasing step 53), a positive voltage change comprised between 0.3V and 0.6V leaves the control voltage CV still lower than 9V. Reset is thereby disabled, while the same reader ESCR2 remains selected. Then, a negative voltage change (decreasing step 54) comprised between 0.3V and 0.6V leaves the control voltage CV higher than 8V. Reset is thereby enabled. Finally, the control voltage CV is decreased back to the standby voltage level 5V (decreasing step 55), so that the reader ESCR with ID=2 is disabled.

4/Smart Card Reader Software Management

An STB installation software enables to configure the following parameters, which must be done prior to any external smart card reader use:

- the number of STB internal smart card readers ISCR,
- the number of STB external smart card readers ESCR,
- the encryption standard defined for each reader SCR,
- and the unique ID (here, up to 4) assigned for each external reader ESCR.

Figure 13:
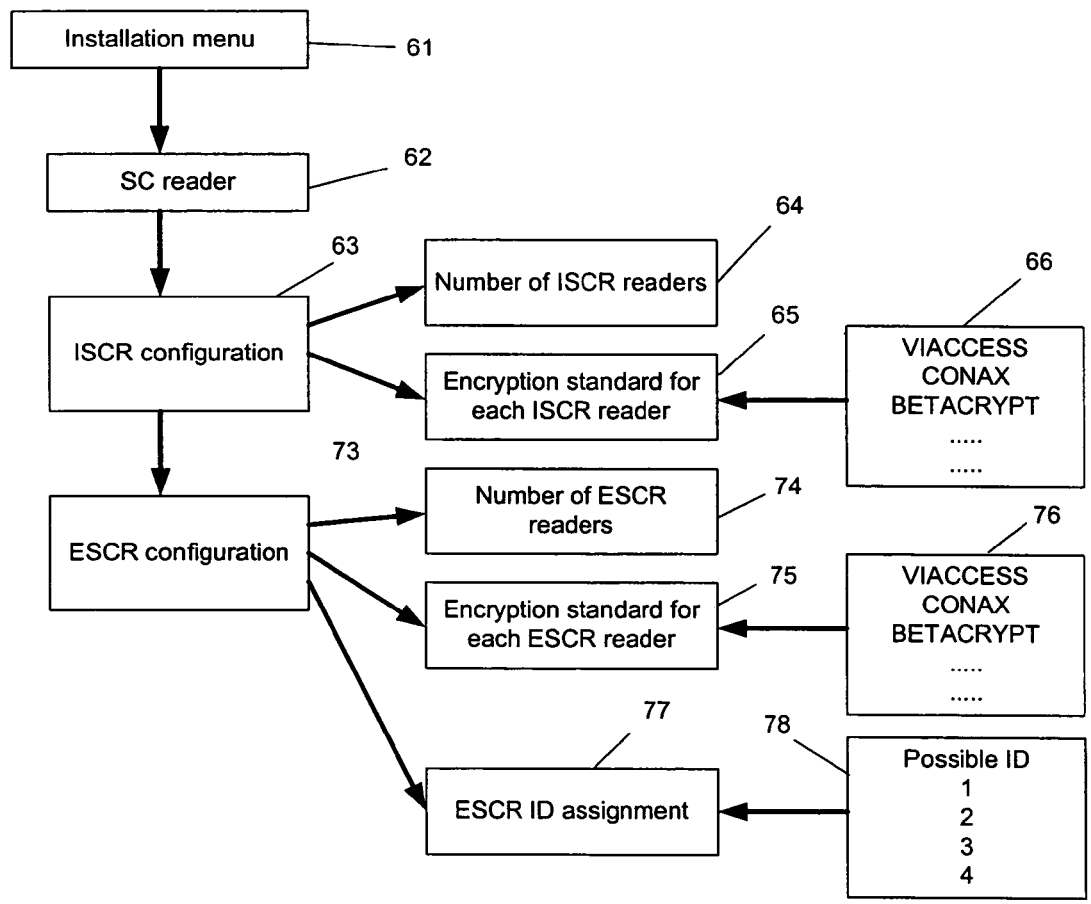
FIG. 13 is a flow chart giving an example of software menu proposed for the STB of FIGS. 3 to 6 to set up the associated smart card readers.

An example of such STB installation SW menu comprises (FIG. 13):

- an installation menu step 61,
- a following smart card reader determination menu step 62,
- a following internal STB smart card reader ISCR configuration menu step 63, involving two steps 64 and 65 related respectively to the number of internal readers ISCR and to the encryption standard for each of them (among given standards 66 like notably Viaccess, Conax and Betacrypt),
- a following external STB smart card reader ESCR configuration menu step 73, involving three steps 74, 75 and 77 related respectively to the number of external readers ESCR, to the encryption standard for each of them (among given standards 76 like notably Viaccess, Conax and Betacrypt), and to the ESCR ID assignment among a set 78 of possible ID between 1 and 4.

The invention claimed is:

1. Control device comprising:
   means for communicating with a plurality of smart card reading devices comprising a first smart card reading device and at least one second smart card reading device, said plurality of smart card reading devices connected in series to the control device, wherein the first smart card reading device is connected to the control device, and the second smart card reading device is connected in series with the first smart card reading device,
   means for processing information received from said smart card reading devices, and
   means for activating at least one of said smart card reading devices for a current communication, wherein said activating means are intended to
   generate selection data intended for the plurality of smart card reading devices, connected in series to said control device, said selection data enabling each of said reading devices to determine if said reading device is selected or not for the current communication, said selection data comprising power supply voltages within one of a plurality of predetermined voltage ranges;
   send the selection data for serial transmission through the plurality of smart card reading devices connected in series, wherein said means for activating transmits selection data to the first smart card reading device, and the first smart card reading device further transmits said selection data to the second smart card reading device.

2. Control device according to claim 1, wherein said activating means are intended to use at least one control voltage available to said reading devices for the selection data, each of said reading devices being associated with a given range of said control voltage.

3. Control device according to claim 2, wherein said control device is intended to provide power supply to said reading devices and wherein said power supply is bearing said control voltage.

4. Control device according to claim 2, wherein said control device further comprises means for controlling reset in said reading devices by sending reset signals towards said reading devices, said reset controlling means being intended to use said control voltage for reset controlling, by causing given voltage changes within said voltage ranges to specify a change of reset state in the reading devices respectively associated to said voltage ranges.

5. Control device according to claim 1, wherein said control device further comprises means for associating said reading devices with respectively given functionalities.

6. Control device according to claim 5, wherein said functionalities are chosen among specific de-encrypting methods and banking.

7. Control device according to claim 1, wherein said control device further comprises means for providing differential transmission clock signals towards said reading devices.

8. Control device according to claim 1, wherein said control device provides clock signals having at least one amplitude towards said reading devices via at least one clock path, said control device comprises means for transmitting data towards said reading devices via at least one of said clock paths, and said data transmission means are intended to specify data transmission towards said reading devices on said clock path by using data signals having an amplitude inferior to a data transmission threshold lower than said clock amplitude on said clock path.

9. Control device according to claim 1, wherein said control device sends clock signals having at least one amplitude towards said reading devices via at least one clock path, and said control device further comprises means for detecting the presence of smart cards associated to said smart card reading devices by receiving detection signals from said reading devices via said clock path.

10. Control device according to claim 9, wherein said control device further comprises means for receiving data from said reading devices via said clock path used for receiving said detection signals, said detection and data reception means being able to recognize respectively the received detection and data signals on said clock path by comparing the amplitudes of the signals received via said clock path to respectively a card detection threshold and a data reception threshold.

11. Set-top box characterized in that it comprises a control device comprising:
  means for communicating with a plurality of smart card reading devices comprising a first smart card reading device and at least one second smart card reading device connected in series to the control device, wherein the first smart card reading device is connected to the control device, and the second smart card reading device is connected in series with the first smart card reading device,
  means for processing information received from said smart card reading devices, and
  means for activating at least one of said reading devices for a current communication, wherein said activating means are intended to
    generate selection data intended for the plurality of smart card reading devices, connected in series to said control device, said selection data enabling each of said reading devices to determine if said reading device is selected or not for the current communication, said selection data comprising power supply voltages within one of a plurality of predetermined voltage ranges;
    send the selection data for serial transmission through the plurality of smart card reading devices connected in series, wherein said means for activating transmits selection data to the first smart card reading device; and the first smart card reading device further transmits said selection data to the second smart card reading device.

12. Set-top box according to claim 11, further comprising at least one output connection element being provided with four communication points respectively intended for:
  output ground signals;
  output positive clock signals;
  output negative clock signals; and
  output power supply, reading devices activation and reset signals.

13. Set-top box according to claim 12, wherein said connection element is such that: the communication point for output negative clock signals is also provided for input detection signals related to the presence of smart cards associated to said reading devices, and for input data reception signals; and the communication point for output positive clock signals is also provided for output data transmission signals.

14. Set-top box-according to claim 11 further comprising at least two daisy-chained smart card reading devices.

15. A computer program stored on a non-transitory computer readable storage medium, embodying instructions that when executed by a computer perform method steps for controlling a device, the method steps comprising, communicating with a plurality of smart card reading devices comprising a first smart card reading device and at least one second smart card reading device, said plurality of smart card reading devices connected in series to the control device, wherein the first smart card reading device is connected to the control device, and the second smart card reading device is connected in series with the first smart card reading device,
  processing information received from said smart card reading devices, and
  activating at least one of said smart card reading devices for a current communication, wherein said activating is intended to:
    generate selection data intended for the plurality of smart card reading devices, connected in series to said control device, said selection data enabling each of said reading devices to determine if said reading device is selected or not for the current communication, said selection data comprising power supply voltages within one of a plurality of predetermined voltage ranges;
    send the selection data for serial transmission through the plurality of smart card reading devices connected in series, wherein activating transmits selection data to the first smart card reading device, and the first smart card reading device further transmits said selection data to the second smart card reading device.

16. A system comprising:
  a control device;
  a first smart card reading device; and
  at least one second smart card reading device;
  the control device comprising:
  means for communicating with a plurality of smart card reading devices comprising the first smart card reading device and the at least one second smart card reading device, wherein the first smart card reading device is connected to the control device, and the second smart card reading device is connected in series with the first smart card reading device,
  means for processing information received from said smart card reading devices, and
  means for activating at least one of said smart card reading devices for a current communication, wherein said activating means is for generating selection data to be sent toward all said reading devices, said selection data enabling each of said smart card reading devices to determine if said smart card reading device is selected or not for the current communication, said activating means are configured to send the selection data intended for the plurality of smart card reading devices serial transmission through the plurality of smart card reading devices connected in series, wherein said activating means are configured to transmit selection data to the first smart card reading device; and the first smart card reading device further transmits said selection data to the second smart card reading device.

17. The system according to claim 16, wherein the control device is contained in a set-top box and wherein the least one second smart card reading device is external to the set-top box.

18. A method of communicating with a plurality of smart card reading devices made up of a first smart card reading device and at least one second smart card reading device connected in series to a control device, wherein the first smart card reading device is connected to the control device, and the second smart card reading device is connected in series with the first smart card reading device, the method comprising the steps of:

activating at least one of said smart card reading devices for a current communication, by:

communicating selection data to be sent toward all said reading devices, said selection data enabling each of said smart card reading devices to determine if said smart card reading device is selected or not for the current communication, wherein said selection data intended for the plurality of smart card reading devices is communicated to the first smart card reading device for serial transmission through the plurality of smart card reading devices connected in series, wherein the first smart card reading device further transmits said selection data to the second smart card reading device, said selection data comprising power supply voltages within one of a plurality of predetermined voltage ranges, communicating with a plurality of smart card reading devices comprising the first smart card reading device and at least one second smart card reading device, and processing information received from said smart card reading devices.

\* \* \* \* \*